United States Patent [19]

Scott et al.

[11] Patent Number: 4,617,194

[45] Date of Patent: Oct. 14, 1986

[54] RADIATION CURABLE ABRASION RESISTANT COATINGS FOR PLASTICS

[75] Inventors: Bruce D. Scott; James W. Watkins, both of Louisville, Ky.

[73] Assignee: Celanese Corporation, New York, N.Y.

[21] Appl. No.: 772,084

[22] Filed: Sep. 3, 1985

[51] Int. Cl.[4] .............................................. B05D 3/06
[52] U.S. Cl. ..................................... 427/54.1; 427/35; 427/44; 522/103; 525/922; 526/313; 526/323.1; 526/323.2
[58] Field of Search ..................... 522/103; 525/922; 427/54.1, 35, 44; 526/313, 323.1, 323.2

[56] References Cited

U.S. PATENT DOCUMENTS

| | | | |
|---|---|---|---|
| 4,125,503 | 11/1978 | McCarty et al. | 260/29.7 NR |
| 4,199,421 | 4/1980 | Kamada et al. | 204/159.22 |
| 4,203,816 | 5/1980 | Vargiu et al. | 204/159.16 |
| 4,273,802 | 6/1981 | Kamada et al. | 427/54.1 |
| 4,397,723 | 8/1983 | Inoue et al. | 204/159.15 |
| 4,479,983 | 10/1984 | Appelt et al. | 427/54.1 |

Primary Examiner—Melvyn I. Marquis
Attorney, Agent, or Firm—Herbert P. Price

[57] ABSTRACT

Coating compositions are made from a blend of an acrylic or methacrylic ester of an aliphatic polyol and an acrylic or methacrylic ester of a polyglycidyl ether of a bisphenol A-formaldehyde condensate. Such coating compositions, when cured by radiation, are useful as abrasion resistant coatings for plastics.

12 Claims, No Drawings

RADIATION CURABLE ABRASION RESISTANT COATINGS FOR PLASTICS

BACKGROUND OF THE INVENTION

The field of art to which this invention pertains is radiation curable coatings.

The use of various polymers, such as polymethyl methacrylate, polycarbonate, polystyrene, styrene-acrylonitrile copolymers, polyesters and the like, have been used as replacements for glass in the manufacture of numerous articles. The polymers have the advantage over glass in that they are light in weight, have excellent shock resistance and are easily moldable. However, for some uses, such as optic uses, i.e., spectacle lenses, camera lenses, covers for lighting fixtures and headlights, the surfaces of the molded polymers are subject to abrasion and scratching. Attempts have been made to improve the abrasion and scratch resistance by coating the surface of the articles. Silicone resins and melamine resins have been used for this purpose. Such coatings are thermosetting types and require heating for long periods to produce cured coatings. The long heating periods reduce productivity and the high temperature can cause distortion of the molded polymer, which is thermoplastic. In an attempt to overcome these problems, U.S. Pat. Nos. 4,273,802 and 4,397,723 describe the use of radiation curable coatings to coat the surface of plastic articles to improve abrasion and scratch resistance. Such coatings are made from a blend of a compound, which contains at least 3 acryloyloxy groups, e.g., trimethylolpropane triacrylate and a compound, which contains only 2 acryloyloxy groups, e.g., the diacrylate ester of the diglycidyl ether of bisphenol A. Such coatings systems have improved abrasion and scratch resistance over the prior art; however, they are still somewhat lacking in these properties.

SUMMARY OF THE INVENTION

This invention is directed to radiation curable coatings. In one aspect, this invention is directed to radiation curable coatings for plastics, which coatings have improved abrasion and scratch resistance. In another aspect, this invention relates to a process for applying the coatings to plastic substrates and curing the coatings with radiation to produce cured coatings having abrasion and scratch resistance.

The radiation curable coating compositions of this invention are made from a blend of an acrylic or methacrylic ester of an aliphatic polyol, and an acrylic or methacrylic ester of a polyglycidyl ether of a bisphenol A-formaldehyde condensate, wherein the aliphatic polyol ester contains at least about 3 acryloyloxy or methacryloyloxy groups per molecule, and wherein the ester of the polyglycidyl ether contains at least about 4 acryloyloxy or methacryloyloxy groups per molecule, and wherein the aliphatic polyol ester and the polyglycidyl ether ester are in the weight ratio of about 70/30 to about 30/70.

When a photoinitiator is included with the blend of the esters, ultraviolet curable coatings are obtained. Such coatings can be applied to plastic substrates, e.g., polycarbonate substrates, and can be cured using ultraviolet radiation to abrasion and scratch resistant coating compositions.

DESCRIPTION OF THE INVENTION

The esters of aliphatic polyols useful in this invention are those which contain at least 3 acryloyloxy or methacryloyloxy groups per molecule, and, preferably, 3 to about 6 acryloyloxy or methacryloyloxy groups per molecule. The aliphatic polyols from which these esters are derived contain at least three aliphatic hydroxyl groups per molecule, and, preferably, three to about six hydroxyl groups and no other reactive groups. Examples of useful aliphatic esters include trimethylolpropane triacrylate, trimethylolpropane trimethacrylate, trimethylolethane triacrylate, trimethylolethane trimethacrylate, pentaerytritol triacrylate, pentaerytritol trimethacrylate, pentaerythritol tetraacrylate, pentaerythritol tetramethacrylate, dipentaerythritol triacrylate, dipentaerythritol tetraacrylate, dipentaerythritol pentaacrylate, dipentaerythritol hexaacrylate and the like. The preferred esters are the acrylate esters, with the most preferred being trimethylolpropane triacrylate.

The esters of the polyglycidyl ethers of bisphenol A-formaldehyde condensates useful in this invention are those esters which contain about 4 to about 12 acryloyloxy or methacryloyloxy groups per molecule. These esters are made by reacting acrylic acid or methacrylic acid with a polyglycidyl ether of a bisphenol A-formaldehyde condensate. The bisphenol A-formaldehyde condensate from which these aromatic esters are derived are made by reacting bisphenol A (p,p'dihydroxydiphenyl propane) with less than an equivalent amount of formaldehyde, thereby forming a molecule made up of a number of bisphenol A molecules linked together by methylene groups. These bisphenol A-formaldehyde condensates are then reacted with epichlorohydrin to form polyglycidyl ethers. The polyglycidyl ethers are then reacted with acrylic or methacrylic acid to form the esters useful in this invention. The bisphenol A-formaldehyde condensates used in this invention contain an average of about 2 moles of bisphenol A up to about 6 moles of bisphenol A per molecule. The preferred bisphenol A-formaldehyde condensate contains an average of about 4 bisphenol A molecules. The resulting ester will contain an average of about 8 acryloyloxy or methacryloyloxy ester groups per molecule. In order to reduce the viscosity of the ester to make it suitable for coatings applications, a small amount of a volatile polar solvent can be added, i.e., up to about 25 weight percent solvent based on the total weight of ester and solvent. Suitable solvents are ketones, e.g., acetone, methylethyl ketone or methyl isobutyl ketone, and aromatic compounds, e.g., toluene and xylene.

The compositions of this invention will contain about 30 to about 70 weight percent ester of aliphatic polyol and about 70 to about 30 weight percent ester of the polyglycidyl ether. A preferred composition contains about 50 to about 60 weight percent aliphatic polyol ester and about 40 to about 50 weight percent polyglycidyl ether ester.

The radiation curable compositions of this invention can be cured by any of the known actinic radiation curing methods. The radiation can be ionizing radiation, either particulate or non-particulate or non-ionizing radiation. As a suitable source of particulate radiation, one can use any source source which emits electrons or charged nuclei. Particulate radiation can be generated from electron accelerators, such as the Vandergraft Accelerator, resonance transformers, linear accelerators, insulating core transformers, and radioactive elements, such as cobalt 60, strontium 90, etc. As a suitable source of non-particulate ionizing radiation, any source, which emits radiation in the range of from about $10^{-3}$ angstroms to about 2,000 angstroms, can be used. Suitable sources are vacuum ultraviolet lamps, such as xenon or krypton arcs. As a suitable non-ionizing source of radiation, any source which emits radiation from about 2,000 angstroms to about 4,000 angstroms can be used. Suitable sources are mercury arcs, carbon arcs, tungsten filament lamps, sunlamps, lasers and the like. All of these devices and sources are well-known in the art, and those skilled in radiation technology are fully aware of the manner in which radiation is generated and precautions to be exercised in its use.

When the radiation curable coating compositions are to be cured by exposure to non-ionizing radiation, e.g., ultraviolet, photoinitiators are added to the composition. Suitable photoinitiators which are well-known in the art are 2,2-diethoxyacetophenone, 2,3 or 4-bromoacetophenone, benzaldehyde, benzoin, benzophenone, 9,10-dibromoanthracine, 4,4'-dichlorobenzophenone, 2,3-pentanedione, hydroxycyclohexylphenyl ketone, xantone and the like. Such photoinitiators are added in amounts up to about 10 weight percent based on the weight of the total curable composition, and, preferably, from about 1 to about 5 weight percent.

Photoactivators can also be used in combination with the photoinitiators. Examples of such photoactivators are methylamine, tributylamine, n-methyldiethanolamine, 2-aminoethylethanolamine, cyclohexylamine, diphenylamine, tribenzylamine and the like.

The radiation curable coating compositions of this invention can be applied by conventional means, including spraying, curtain coating, dip padding, roll coating, and brushing procedures. The coatings can be applied to any acceptable substrate, such as wood, metal, glass, fabric, paper, fiber, plastic, etc., but, preferably, are applied to plastics. A particularly preferred plastic substrate is polycarbonate.

The following examples describe the invention in more detail. Parts and percentages unless otherwise designated are parts and percentages by weight.

EXAMPLE 1

To 40 parts of a solution of an acrylic ester of a polyglycidyl ether of a bisphenol A-formaldehyde condensate and methylisobutyl ketone at 80% solids were added 60 parts of trimethylolpropane triacrylate and 10 parts of hydroxycyclohexylphenyl ketone (Irgacure 184 obtained from Ciba-Geigy Corporation). The acrylic ester of the polyglycidyl ether of the bisphenol A-formaldehyde condensate contained an average of 8 acryloyloxy groups and was derived from the reaction of acrylic acid with a polyglycidyl ether of a bisphenol A-formaldehyde condensate having an epoxide equivalent weight of 215. The bisphenol A-formaldehyde condensate was the reaction product of 4 moles of bisphenol A and 3 moles of formaldehyde. The resulting blend had a viscosity of 900 cps (Brookfield at 25° C., No. 4 spindle at 20 rpm).

Polycarbonate panels were coated with the blend using a No. 6 Meyer bar. The coatings were cured at a line speed of 13 feet per minute using two passes through a Fusion Ultraviolet Curing Unit, Model F-440, Fusion Systems Corporation, Rockville, Md., with two 300 watt per linear inch mercury vapor lamps. The coatings, after being cured, exhibited 100% adhesion to the substrate, had methylethyl ketone (MEK) resistance of greater than 400 double rubs, Taber abrasion resistance of 0.0001–0.0002 grams weight loss, and no scratches after 11 double rubs with 0000 steel wool. The % light transmission of the abraded areas was 97.0 and 94.8.

Adhesion of the cured coatings to the substrate was determined as follows: The coatings were cross-hatched with scratch lines so as to form 100 squares. The cross-hatched area was covered with 3M Company 610 Scotch Cellophane tape and even pressure was applied to the tape so that it would adhere evenly to the coating. The tape was then pulled from the coating and the % adhesion was determined by counting the squares which were removed by the tape.

Taber abrasion resistance was determined on a Taber Abraser, Model E-4010, using CS-17 wheels with a 500 gm load. The abrasion resistance is reported as grams of coating lost during the abrasion test after 300 cycles. Light transmission of the abraded areas was determined with a spectrophotometer as % transmission at 550 nm wavelength.

EXAMPLE 2

To 99.5 parts of the blend described in Example 1 were added 0.5 part of a silicone-glycol copolymer (Dow Corning 190). The resulting blend was used to coat a polycarbonate panel using a No. 6 Meyer rod. The coating was cured using the curing unit described in Example 1 at 14 feet per minute in 2 passes. No scratches were observed after 10 double rubs with 0000 steel wool under a 2 pound hammer. After 20 double rubs with pressure applied to the hammer, 2 slight scratch marks were observed.

EXAMPLE 3

A blend was made as described in Example 1 using 40 parts of the solution of acrylic ester of the polyglycidyl ether of bisphenol A-formaldehyde condensate described in Example 1, 60 parts of trimethylolpropane triacrylate and 10 parts of Irgacure 184. This blend was labeled Blend A. Another blend was prepared (Blend B) using 40 parts of the diacrylic ester of the digycidyl ether of bisphenol A having an epoxide equivalent weight of 190, 60 parts of trimethylolpropane triacrylate and 10 parts of Irgacure 184. Coatings were drawn down on polycarbonate panels using a No. 6 Meyer rod and the coatings were cured using the curing unit described in Example 1 at 14 feet per minute in 2 passes. The properties of the cured coatings were:

| Blend | A | B |
| --- | --- | --- |
| Adhesion | 100% | 100% |
| Flexibility | Good | Good |
| Scratch Resistance | No Scratches | 25+ Scratch Marks |
| Abrasion | 97.0 | 38.9 |
| % Transmission | 94.8 | 50.4 |

As can be seen, the abrasion resistance of the invention (Blend A) as determined by light transmission through the abraded area was much greater than the abrasion resistance of the prior art (Blend B).

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A radiation curable coating composition comprising a blend of (A) an acrylic or methacrylic ester of an aliphatic polyol having at least 3 acryloyloxy or methacryloyloxy groups per molecule, and (B) an acrylic or methacrylic ester of a polyglycidyl ether of a bisphenol A-formaldehyde condensate having at least 4 acryloyloxy or methacryloyloxy groups per molecule, wherein (A) and (B) are in the weight ratio of about 30/70 to about 70/30.

2. The composition of claim 1 wherein the weight ratio of (A) to (B) is about 70/30 to about 50/50.

3. The composition of claim 1, which contains a photoinitiator.

4. The composition of claim 1 wherein the acrylic ester of the aliphatic polyol is trimethylolpropane triacrylate.

5. The composition of claim 1 wherein the acrylic ester of the polyglycidyl ether contains an average of about 8 acryloyloxy groups per molecule.

6. A process for coating plastic substrates which comprises
  (a) applying to the substrate a coating composition which comprises a blend of (A) an acrylic or methacrylic ester of an aliphatic polyol having at least three acryloyloxy or methacryloyloxy groups per molecule, and (B) an acrylic or methacrylic ester of polyglycidyl ether of a bisphenol A-formaldehyde condensate having at least 4 acryloyloxy or methacryloyloxy groups per molecule, wherein (A) and (B) are in the weight ratio of about 30/70 to about 70/30; and
  (b) curing the coating with actinic radiation.

7. The process of claim 6 wherein the coating composition contains a photoinitiator.

8. The process of claim 7 wherein the coating composition is cured with ultraviolet radiation.

9. The process of claim 6 wherein the weight ratio of (A) to (B) is about 70/30 to about 50/50.

10. The process of claim 6 wherein the acrylic ester of the polyol is trimethylolpropane triacrylate.

11. The process of claim 6 wherein the acrylic ester of the polyglycidyl ether contains an average of about 8 acryloyloxy groups per molecule.

12. The process of claim 6 wherein the plastic substrate is a polycarbonate substrate.

* * * * *